April 8, 1958  B. F. BAUMANN  2,829,793
LIQUID CONTAINER, AND JOINTS INCORPORATED THEREIN
Filed July 11, 1955
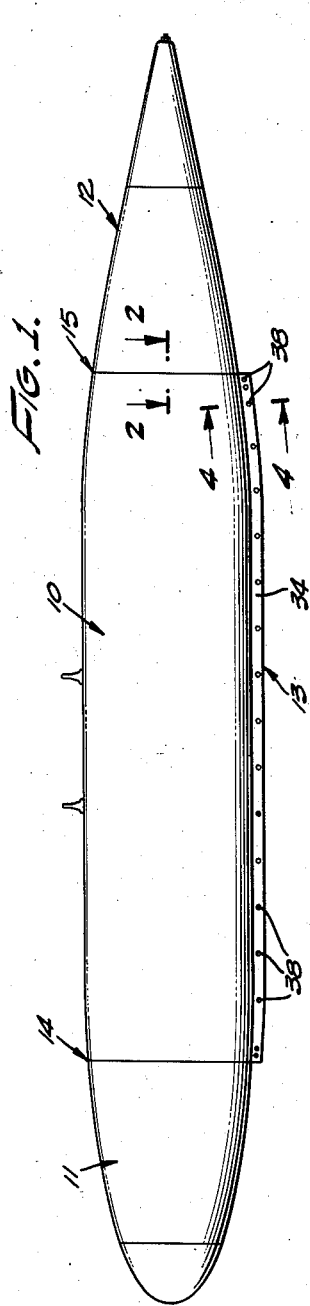
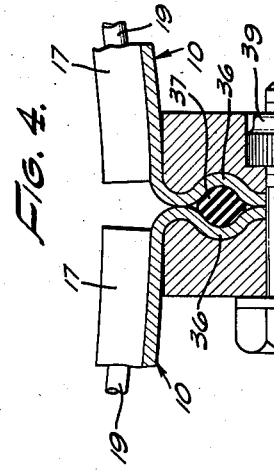
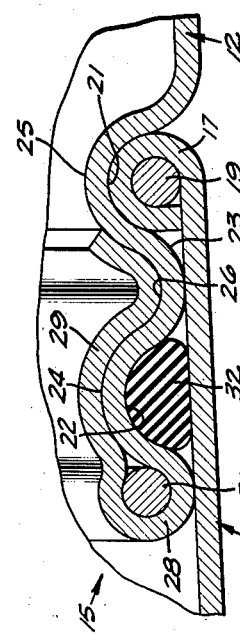
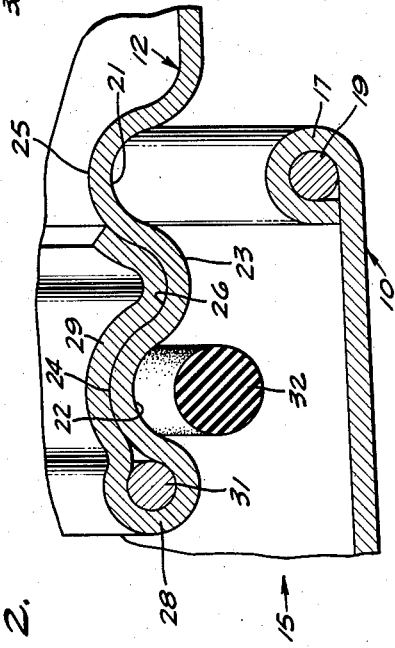
BILLY FRANKLIN BAUMANN
INVENTOR.
BY
ATTORNEY 000# United States Patent Office 2,829,793
Patented Apr. 8, 1958

2,829,793

LIQUID CONTAINER AND JOINTS INCORPORATED THEREIN

Billy Franklin Baumann, Northridge, Calif., assignor to Royal Jet, Inc., Alhambra, Calif., a corporation of California Application July 11, 1955, Serial No. 521,197

9 Claims. (Cl. 220—5)

This invention relates to a liquid container and to the circumferential joints incorporated therein. More particularly, the invention relates to a sheet metal jettisonable container such as a fuel tank or fire bomb.

The problem of forming the circumferential joints of sheet metal tanks and containers, and more particularly of jettisonable fuel tanks and fire bombs carried by military aircraft, has been extremely difficult to solve for a number of reasons. In the first place, the circumferential joints between the tank sections must be extremely strong and leak proof, particularly in the case of jettisonable external wing tanks which are subject to extreme stresses and vibrations such as are set up at supersonic speeds. In the second place, the circumferential joints must be capable of being assembled in an extremely short period of time, sometimes by relatively unskilled personnel. This is because vast numbers of jettisonable fuel tanks and fire bombs, etc., after being shipped in knocked down and stacked relation from the factory to airfields disposed in all parts of the world, must be put together by army personnel who, in some instances, are not particularly skilled in the assembly operation. It will therefore be understood that if the circumferential joints are so complex that hours are required for assembly of each tank or bomb, a substantial amount of military manpower will be diverted from other uses and thus wasted. In the third place, and very importantly, the circumferential joints must be such that the tank, or a number of tanks, may be stacked together during shipment in a very high-nesting relationship such that shipping space is minimized.

In order to achieve the high-nesting relationship by which corresponding components of a number of tanks may be stacked or telescoped together to thus conserve shipping space, jettisonable fuel tanks for aircraft have previously been designed with a nose section, a tail section and a generally cylindrical center section extending between the nose and tail sections. The center section is formed with a longitudinal split or seam which is spread progressively apart, during packaging for shipment, in order to adjust the diameters of the various stacked center sections to permit the telescoping or nesting operation. However, previous jettisonable aircraft fuel tanks were designed so that during assembly at the airfield the longitudinal center section joints were formed independently of the circumferential joints between the center section and the nose and tail sections. It follows that it was necessary to provide a special means, substantially completely independent of the longitudinal center section joint, for forming the circumferential joints.

In view of the above factors characteristic of circumferential joints and containers incorporating the same, it is an object of the present invention to provide a sheet metal tank in which the circumferential joints are formed at the same time as the longitudinal joint in the center section, and in which the longitudinal and circumferential joints are mutually interrelated in such manner that the resulting tank is extremely strong yet extremely simple to assemble.

A further object of the invention is to provide a jettisonable tank formed of a plurality of sheet metal sections having circumferential joints therebetween, and in which the interlock means at the joints are integral with the respective sheet metal sections instead of being welded or otherwise connected thereto.

An additional object is to provide integral sheet metal joints having reinforcing and bead forming means comprising wire or the like.

These and other objects and advantages of the invention will be more fully set forth in the following specification and claims considered in connection with the attached drawing to which they relate.

In the drawing:

Figure 1 is a side elevational view of a jettisonable fire bomb incorporating the present invention;

Figure 2 is an enlarged fragmentary longitudinal sectional view taken on line 2—2 of Figure 1, as viewed in the direction of the arrows;

Figure 3 is a view corresponding to Figure 2 but illustrating the components in exploded position; and Figure 4 is an enlarged transverse fragmentary section on line 4—4 of Figure 1.

Referring to the drawing, and particularly to Figure 1, the liquid container is illustrated as a fire or napalm bomb formed of sheet metal, preferably aluminum, and adapted to be supported beneath the wing of an airplane until jettisoned. The bomb comprises a generally cylindrical elongated center section 10, and generally tapered or conical nose and tail sections 11 and 12. Both the nose section and the tail section are made of several components and include fuse means and the like, not shown, but these components may in each instance be treated as one for purposes of the present invention. A longitudinal joint 13 is formed between the opposed longitudinal edges of a split portion of center section 10, and circumferential joints 14 and 15 are formed, respectively, between the center section and the nose and tail sections. Since the circumferential joints 14 and 15 are substantially identical except that they are left and right, only the joint 15 between center section 10 and tail section 12 will be described.

Referring to Figures 2 and 3, the extreme end edge of center section 10 is rolled radially inwardly, and back upon itself, to form a bead or ridge 17 having a generally tubular shape. Bead 17 is continuous except at the longitudinal joint 13 (Figure 4) where it is split so that radial flanges 18 formed on the opposed longitudinal edges of center section 10 may be moved apart and together during the assembly operation. It is an important feature of the invention that a strong metal wire loop 19, preferably having a cylindrical shape, is mounted in the hollow center of bead 17 and entirely fills the same as shown in Figures 2 and 3. Wire loop 19 strengthens the bead in such a way that the possibility of its unrolling and failure is minimized. Because of the presence of wire loop 19, it is assured that the innermost surface of the bead will be rounded so that it may cooperate properly with a channel or groove to be described subsequently.

The wide end portion of tail 12 is generally cylindrical, and is formed on its exterior and interior surfaces with corresponding corrugations or undulations. More particularly, the outer surface of the corrugated end portion is formed with two channels or grooves 21 and 22 separated by a ridge 23, whereas the opposite inner surface of the same portion is formed with two ridges 24 and 25 separated by a channel 26.

The extreme free edge 28 of tail 12 is return bent as shown in Figures 2 and 3, the bending being such that an integral reinforcing portion 29 is provided radially inwardly of ridge 24 and channel 26 and in surface contact therewith. It is emphasized that the free edge 28, at which the return bending takes place, is formed as a tubular bead in which is disposed a wire 31 which completely fills the same. Wire 31 is preferably continuous throughout the circumference of the tank, and provides an additional reinforcing action.

As shown in Figure 2, the bead 17 is inserted or nested in channel 21 so that these elements form interlock means preventing longitudinal shifting of the center section 10 and tail section 12 relative to each other. A seal ring 32, preferably an elastomeric or plastic O-ring, is mounted in channel 22 and sealingly engages the inner surface of center section 10 as shown in Figure 2, so that leakage of napalm through the circumferential joint is prevented.

The longitudinal joint 13 between the opposed edges of center section 10 comprises a pair of bars 34 disposed on opposite sides of flanges 18 and having grooves to accommodate channel portions 36 of these flanges. The channel portions cooperate to receive a straight O-ring 37 which prevents leakage of napalm through the longitudinal joint. Bolts 38 are inserted through the bars 34 and flanges 18 beneath O-ring 37, and are threaded into spline nuts 39 which are non-rotatably seated in recesses in one of the bars 34. The bolts 38 and cooperating nuts 39 are provided at spaced points throughout the length of center section 10, but two bolts are preferably provided at each end of the center section to give added strength to the circumferential joints.

The method of assembling the liquid container is as follows. Prior to assembly of longitudinal joint 13, O-ring 32 is seated in channel 22, after which the longitudinal edges of center section 10 are spread apart to increase the diameter of the center section. After the diameter is thus increased, the generally cylindrical end portion of center section 10 is wrapped around the corrugated end portion of tail 12, and bead 17 is inserted in channel 21. Thereafter, O-ring 37 is mounted in the longitudinal joint, and bolts 38 are tightened into their respective spline nuts 39 to draw the flanges 18 together and thus reduce the diameter of the center section 10 until the position shown in Figure 2 is reached, O-ring 32 then being compressed and in sealing engagement with the adjacent skin portions. The longitudinal and both circumferential joints of the tank are thus formed easily in a minimum of time, yet are sufficiently strong to withstand the shock present when the bombs are suspended beneath the wings of supersonic aircraft.

Because of the fact that the inner portion of bead 17 is curved correspondingly to the curvature of the walls of channel 21, a cam action is provided between these elements which has the effect of shifting center section 10 and tail 12 axially relative to each other, and to the desired position, as the bolts 38 are tightened in their nuts 39. Thus, the pre-assembly may be relatively inaccurate yet the completed tank will be perfect.

Because of the presence of wires 19 and 31, and because of the formation of the end of tail 12 with correspondingly corrugated and return bent inner and outer portions, the circumferential joints are extremely strong, yet are easy to manufacture.

It is to be understood that suitable sealing means, not shown, are provided at the intersections of O-rings 32 and straight O-ring 37, in order to prevent leakage of napalm through the intersections between the longitudinal joint 13 and circumferential joints 14 and 15.

While the particular apparatus herein shown and disclosed in detail is fully capable of attaining the objects and providing the advantages hereinbefore stated, it is to be understood that it is merely illustrative of the presently preferred embodiments of the invention and that no limitations are intended to the details of construction or design herein shown other than as defined in the appended claims.

I claim:

1. A joint between two generally cylindrical end portions of sheet metal sections of a liquid container, one of said sections being longitudinally split to form opposed longitudinal edges, which comprises a radially inwardly extending circumferential bead formed on the extreme edge of the end portion of said one section, corrugations formed integral with and on the inner and outer surfaces of the end portion of the other of said sections, said corrugations forming at least two outwardly facing circumferential grooves one of which is relatively close to and the other of which is relatively remote from the extreme edge of said end portion of said other section, a seal ring disposed in said one circumferential groove and sealingly engaging the inner surface of said end portion of said one section, said other groove receiving said bead in interlocking relation, and means to form a sealed joint between said longitudinal edges to maintain said bead in said other groove and to maintain said seal ring in sealing engagement with said end portion of said one section.

2. The invention as claimed in claim 1, in which said bead is generally tubular in shape and is formed by bending said extreme edge, and in which a wire is provided in the hollow center of said bead.

3. The invention as claimed in claim 2, in which said other groove has curved side walls complementary to the inner portion of said bead.

4. The invention as claimed in claim 1 in which said end portion of said other section is return bent over said corrugations and is correspondingly corrugated to provide a reinforcing action.

5. The invention as claimed in claim 4, in which a circumferential strengthening wire is provided between said corrugations and the return bent portion, said wire being inserted at the point of return bending.

6. A jettisonable tank formed of thin-walled sections, which comprises a generally cylindrical center section which is longitudinally split to form opposed longitudinal edges, generally tapered or conical nose and tail sections having wide end portions corresponding to the ends of said center section, radially inwardly extending circumferential beads formed on the end edges of said center section, corrugations formed integral with and on the inner and outer surfaces of said wide end portions of said nose and tail sections, the corrugations on each of said wide end portions forming at least two outwardly facing circumferential grooves one of which is relatively remote from and the other of which is relatively close to the free edge of the wide end portion, said one groove receiving said bead and said other groove receiving a seal ring, and means to sealingly join said longitudinal edges.

7. An aerodynamically-shaped jettisonable fuel tank for aircraft formed in a plurality of sections including conical end sections and a generally tubular center section having a longitudinal split seam, said end sections having a wire reinforced bead at their opposite ends with all portions lying radially inside the exterior surface of said center section, said end sections having a plurality of annular grooves formed in the walls thereof rearwardly of the beaded rim ends thereof, said mid-section having an inwardly-beaded wire-reinforced rim at its opposite ends formed to nest in the remotely spaced ones of the grooves in said end sections, and resilient sealing gasket means seated in another of said annular grooves for forming a fluid-tight seal as the longitudinal seam of said center section is clamped together.

8. A jettisonable fuel tank as defined in claim 7 wherein the overlapping ends of said center section with said end sections are so formed that the exterior surfaces of said sections merge smoothly with one another.

9. A jettisonable fuel tank as defined in claim 7 wherein said conical end sections are formed from thin sheet metal with the base rim edges folded inwardly and backwardly to provide an edge of double thickness, a wire ring held captive at the return bend of said double wall, and said annular grooves being formed in the portions of said rims adjacent said wire ring.

References Cited in the file of this patent

UNITED STATES PATENTS

| | | |
|---|---|---|
| 1,253,902 | Steinhart | Jan. 15, 1918 |
| 2,414,366 | Elze | Jan. 14, 1947 |
| 2,471,296 | Allen et al. | May 24, 1949 |
| 2,482,558 | Scaringella | Sept. 20, 1949 |
| 2,727,286 | Moore | Dec. 20, 1955 |